US012641407B2

(12) United States Patent
Avetoom

(10) Patent No.: US 12,641,407 B2
(45) Date of Patent: May 26, 2026

(54) SUPPLEMENTARY SERVICE SETTINGS SYNCHRONIZATION FOR FIFTH GENERATION (5G) TELECOMMUNICATION NETWORKS

(71) Applicant: T-Mobile USA, Inc., Bellevue, WA (US)

(72) Inventor: Paul Avetoom, Renton, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 542 days.

(21) Appl. No.: 18/328,995

(22) Filed: Jun. 5, 2023

(65) Prior Publication Data

US 2024/0129707 A1     Apr. 18, 2024

Related U.S. Application Data

(60) Provisional application No. 63/379,197, filed on Oct. 12, 2022.

(51) Int. Cl.
| | |
|---|---|
| *H04W 8/00* | (2009.01) |
| *H04W 4/12* | (2009.01) |
| *H04W 8/04* | (2009.01) |

(52) U.S. Cl.
CPC .............. *H04W 8/04* (2013.01); *H04W 4/12* (2013.01)

(58) Field of Classification Search
None
See application file for complete search history.

(56) References Cited

U.S. PATENT DOCUMENTS

| | | | |
|---|---|---|---|
| 11,889,391 B2 * | 1/2024 | Shan ..................... | H04W 12/08 |
| 11,930,474 B2 * | 3/2024 | Kedalagudde .......... | H04W 8/12 |
| 2016/0100306 A1 * | 4/2016 | Brianza ............... | H04L 65/1063 |
| | | | 455/433 |

FOREIGN PATENT DOCUMENTS

WO      WO-2013174060 A1 * 11/2013   .......... H04M 1/2757

* cited by examiner

*Primary Examiner* — Gerald A Smarth
(74) *Attorney, Agent, or Firm* — Lee & Hayes, P.C.

(57) ABSTRACT

Described herein are techniques, devices, and systems for synchronizing nodes that are utilized to provide services in a telecommunication network that includes a fifth generation (5G) network, and other types of networks. The nodes can be utilized to store supplementary service settings. A node of the 5G network that stores the supplementary service settings can be a unified data management (UDM). The UDM can be synchronized with a node (e.g., a home subscriber server (HSS)) that stores supplementary service settings in a long-term evolution (LTE) network, and/or a node (e.g., a home location register (HLR)) that stores supplementary service settings in a second generation (2G)/third generation (3G) network.

20 Claims, 5 Drawing Sheets

400

RECEIVE A REQUEST MESSAGE INDICATING MODIFICATION OF A
SUPPLEMENTARY SERVICE SETTING STORED IN A DATABASE
402

TRANSMIT A REPLICATE MESSAGE TO REQUEST REPLICATION
OF THE MODIFIED SUPPLEMENTARY SERVICE SETTING IN A
REMAINING DATABASE
404

RECEIVE A CONFIRM MESSAGE INDICATING SUCCESSFUL
REPLICATION OF THE SUPPLEMENTARY SERVICE SETTING
406

500

SERVER COMPUTER 500

PROCESSOR(S) 502

INSTRUCTIONS/LOGIC 518

DATA 520

REMOVABLE STORAGE 506

NON-REMOVABLE STORAGE 508

INPUT DEVICE(S) 510

OUTPUT DEVICE(S) 512

COMMUNICATIONS INTERFACE(S) 514

OTHER NETWORK/ COMPUTING DEVICES 516

SUPPLEMENTARY SERVICE SETTINGS SYNCHRONIZATION FOR FIFTH GENERATION (5G) TELECOMMUNICATION NETWORKS

CROSS REFERENCE TO RELATED APPLICATIONS

This patent application claims priority to U.S. Provisional Patent Application Ser. No. 63/379,197, filed Oct. 12, 2022. Application Ser. No. 63/379,197 is fully incorporated herein by reference.

BACKGROUND

Application networks, e.g., an internet protocol (IP) multimedia subsystem (IMS) network defined by the $3^{rd}$ generation partnership project (3GPP), can be utilized for delivering various services to user equipment (UEs). IMS services can be provided to UEs based on settings of subscriptions of users of the UEs that are maintained by the application networks. Subscription settings can be stored and modified utilizing different types of network nodes of corresponding telecommunication networks to which the users subscribe.

The network nodes can be utilized to store supplementary service settings (or "parameters") of the subscriptions of the users. The supplementary service settings can be configured and reconfigured based on requests transmitted by the UEs. Management of the supplementary service settings can be performed by a unified data management (UDM) in a fifth generation (5G) network. Management of the supplementary service settings can be performed by a home subscriber server (HSS) in a long-term evolution (LTE) network, and by a home location register (HLR) in a second generation (2G)/third generation (3G) network. The HSS and the HLR can be synchronized.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Figure 1:
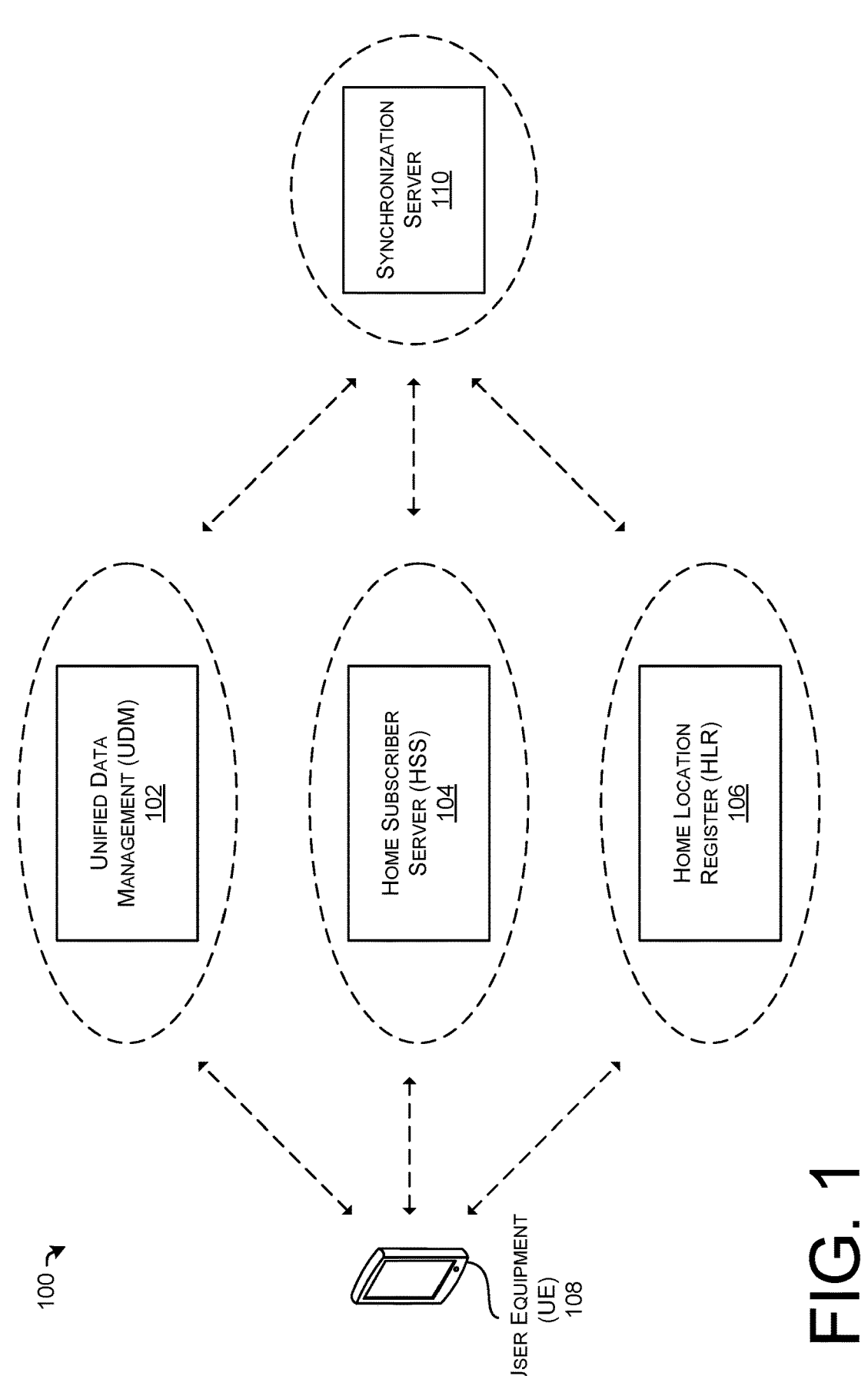
FIG. 1 schematically illustrates an example network environment with nodes of application networks, including an internet protocol (IP) multimedia subsystem (IMS) network of a fifth generation (5G) network, for synchronizing supplementary service settings, in accordance with some examples of the present disclosure.

The systems, devices, and techniques described herein can be implemented in a number of ways. References are made to the accompanying drawings that form a part hereof, and in which are shown by way of illustration specific configurations or examples, in which like numerals represent like elements throughout the several figures.

Techniques described herein are directed to synchronizing a node that is utilized to provide services in a fifth generation (5G) telecommunication network with nodes utilized to provide services in other telecommunication networks (or "networks"). Individual ones of any of the nodes in any of the networks can be utilized to store supplementary service settings. The node of the 5G network that stores the supplementary service settings can be a unified data management (UDM). The UDM can be synchronized with a node that stores supplementary service settings in a long-term evolution (LTE) network, and possibly with a node that stores supplementary service settings in a second generation (2G)/ third generation (3G) network, as well. In some examples, the node of the LTE network that stores the supplementary service settings and that is synchronized with the UDM, and possibly the HLR as well, can be a home subscriber server (HSS). In those or other examples, the node of the 2G/3G network that stores the supplementary service settings and that is synchronized with the UDM, and possibly the HSS as well, can be a home location register (HLR).

A synchronization server can be utilized to perform synchronization of between any of the nodes, such as between the UDM, the HSS, and the HLR (e.g., between the UDM and one or more of the HSS and the HLR, between the HSS and one or more of the UDM and the HLR, and/or between the HLR and one or more of the UDM and the HSS). By way of example, the synchronization server can be utilized to replicate, in the HSS and/or the HLR, supplementary service settings of the UDM that are stored and/or modified. By way of another example, the synchronization server can, alternatively or additionally, be utilized to replicate, in the UDM, supplementary service settings of the HSS and/or the HLR that are stored and/or modified.

Messages exchanged between the synchronization server and one or more of the UDM, the HSS, and the HLR can be utilized to synchronize the UDM, the HSS, and/or the HLR. The messages exchanged between the synchronization server and the UDM, the HSS, and/or the HLR can be generated and transmitted based on messages transmitted by devices (e.g., user equipment (UEs) and/or customer care devices). Messages can be transmitted by the HSS and to the synchronization server to request synchronization of the UDM with the HSS and/or the HLR, based on messages transmitted by the devices (e.g., the UEs and/or the customer care devices) and received by the UDM. Messages can be transmitted by the HSS and/or the HLR, and to the synchronization server, to request synchronization of the HSS and/or the HLR, with the UDM, based on messages that are transmitted by the devices (e.g., the UEs and/or the customer care devices) and received by the HSS and/or the HLR.

Accordingly, the techniques, devices, and systems described herein improve the resiliency of a telecommunications network by leveraging a synchronization server to trigger synchronization between the UDM, the HSS, and/or the HLR. The synchronization utilized to replicate supplementary service settings of the UDM in one or more of the HSS and the HLR, and vice versa, can be performed to ensure UEs can perform reliably. In this way, establishment and/or modification of services for the UEs (and, hence, the users thereof) can be processed faster and/or more reliably, as compared to procedures according to current technology that includes synchronization between the HSS and the HLR. Implementing synchronization for the UDM enables UEs of users with subscriptions to 5G telecommunication networks to operate more effectively than in the procedures according to current technology, which do not include synchronization between the UDM and one or more of the HSS and the HLR.

Techniques described herein can be further used to optimize allocation and/or utilization of computing resources and/or networking resources. By performing synchronization between the UDM and one or more of the HSS and the HLR, customized synchronization tasks that are otherwise performed on a case by case basis, and often manually, according to existing techniques in order to ensure accuracy of supplementary service settings stored in the UDM, the HSS, and the ULR, are not required. The necessity of tracking, and/or responding to, errors (e.g., errors resulting from supplementary service settings being configured and/or reconfigured in the UDM but not replicated in the HSS and/or the HLR, or vice versa) that would otherwise result from utilization of procedures according to current technology, can be avoided. Resources (e.g., computing resources and/or network resources), which are often consumed as a result of existing techniques, can be allocated, according to the techniques discussed herein, for other tasks to improve overall performance and/or reliability of the resources (e.g., the system resources and/or the network resources).

As used herein, a node can be interpreted as the UDM, the HSS, or the HLR, although the current disclosure is not limited as such. Any of the techniques discussed throughout the current disclosure can be implemented with any number of nodes of any type in any type of telecommunication network. In some examples, the term node can be utilized to refer to any of the UDM, the HSS, the HLR, any other node, and/or a server (e.g., a server (or "computing device") utilized to implement the UDM, the HSS, the HLR, and/or any server of any other type).

Although terms (e.g., UDM, HSS, and/or HLR) of various nodes utilized to manage data (e.g., supplementary services settings) are utilized throughout this disclosure, it is not limited as such. Management of data utilizing the nodes according to any of the techniques as discussed herein can be interpreted as being implemented by individual databases of the corresponding nodes.

Illustrative Systems for Synchronizing Supplementary Service Settings of Nodes of Application Networks, Including an Internet Protocol (IP) Multimedia Subsystem (IMS) Network of a Fifth Generation (5G) Network FIG. 1 schematically illustrates an example network environment 100 with nodes of application networks, including an internet protocol (IP) multimedia subsystem (IMS) network of a fifth generation (5G) network, for synchronizing supplementary service settings, in accordance with some examples of the present disclosure.

The environment 100 can include nodes utilized to store subscriber data (e.g., one or more supplementary service settings). The nodes can include a node utilized to provide services in a fifth generation (5G) network (or "5G network"). By way of example, the node in the 5G network can be a unified data management (UDM) node (or "UDM") 102. In some instances, with examples in which the environment 100 includes the UDM and possibly a home location register (HLR) node (or "HLR") 106, as discussed below, the environment 100 can include a node utilized to provide services in a long term evolution network (LTE) network (or "LTE network"). The node in the LTE network can be a home subscriber server (HSS) node (or "HSS) 104. In some instances, with examples in which the environment 100 includes the UDM and possibly the HSS, the environment 100 can include a node utilized to provide services in a second generation (2G) and/or third generation (3G) network (or "2G/3G network"). In some examples, the node utilized to provide services in the 2G/3G network can be the HLR 106.

The subscriber data stored in the nodes can be associated with subscribers of the telecommunication service providers. User equipment (UEs) of the subscribers, which can include a UE 108, can be communicatively connected to a telecommunication network. In some examples, the telecommunication network can include the 5G network, which can include an application network (e.g., an IMS network connected to one or more of the UEs via one or more access networks, such as serving network(s) and/or home network (s)) and/or a core network (or "5G core"). In those or other examples, the telecommunication network can include the LTE network, which can include an application network (e.g., an IMS network connected to one or more of the UEs via one or more access networks (or "4G/LTE access network(s)"), such as serving network(s) and/or home network (s)) and/or an evolved packet core (EPC). In those or other examples, the telecommunication network can include the 2G/3G network, which can include an application network (e.g., a circuit switched (CS) core network connected to one or more of the UEs via one or more access networks (or "2G/3G access network(s)), such as serving network(s) and/or home network(s)).

The nodes can be included in corresponding application networks operated by telecommunication service providers (or "carriers"). By way of example, the UDM 102 can be included in the IMS network of the 5G network. In some instances, with examples in which the environment 100 includes the HSS 104, the HSS 104 can be included in the IMS network of the LTE network. In some instances, with examples in which the environment 100 includes the HLR 106, the HLR 106 can be included in a network (e.g., the CS core network) of the 2G/3G network, the CS core network implementing circuit-switched (CS) communication protocols to provide various services.

The environment 100 can include a synchronization server 110 utilized to synchronize nodes (or "subscriber data management nodes")) that can store subscriber data. The UDM 102 can be connected, via the 5G network, to the synchronization server 110. One or more other nodes connected to the synchronization server 110 can include the HSS 104 connected, via the LTE network, to the synchronization server 110, and/or the HLR 106 connected, via the 2G/3G network, to the synchronization server 110. The synchronization server 110 can be utilized to synchronize the UDM 102 with one or more of the other node(s). In some examples, the synchronization server 110 can be utilized to synchronize the UDM 102 with the HSS 104 and/or the HLR 106.

The subscriber data management nodes can be synchronized based on requests received from UEs or customer care devices (e.g., a customer care representative device of a customer care system). By way of example, a request received from the UE 108 or a customer care device can be utilized to store and/or modify one or more supplementary service setting(s) in any of the nodes (e.g., the UDM 102). The stored and/or modified supplementary service setting(s) can be replicated in one or more remaining ones of the subscriber data management nodes (e.g., the HSS 104 and/or the HLR 106).

The subscriber data management nodes can be utilized to manage various types of supplementary service setting(s). The subscriber data stored in individual ones of the nodes (e.g., the UDM 102, the HSS 104, and the HLR 106) can include user-related and/or subscriber-related information, the subscriber data being utilized to support functions in mobility management (e.g., management of roaming restrictions, etc.), call and session setup, security management (e.g., security key management), user authentication, and/or access authorization (e.g. authorization to other wireless networks, or other types of networks). In some examples, the subscriber data stored in individual ones of the UDM 102 and the HSS 104 can include one or more of an IMS public user identity (IMPU)), an IP Multimedia Private User Identity (IMPI), and an IP address (e.g., an IP address utilized by the UE 108 to connect to any portion (e.g., the 5G network for the UDM 102, the LTE network for the HSS 104, etc.) of the telecommunication network. In some examples, the subscriber data stored in individual ones of the UDM 102, the HSS 104, and the HLR 106 can include one or more of a mobile station international subscriber director number (MSISDN) (e.g., a phone number of a user associated with the UE 108), an international mobile subscriber identity (IMSI), subscriber identity module (SIM) card data, a service provider login (e.g., an identifier including an account name and an active directory associated with an account provided by a service provider), user account data (e.g., account name, account number, etc.), service provider data (e.g., a current service provider, available service providers, service(s) available via the service provider, etc.), brand data (e.g., a current brand of the UE 108, etc.), context data (e.g., which application(s) are executing on the UE 108), capability data (e.g., which radio access technology(s) the UE 108 is configured to use, etc.), authentication data, location data (e.g., data associated with a physical location of the UE 108), and/or the like.

The environment 100 can include one or more application servers (ASs) connected to the telecommunication network (e.g., the 5G core network and/or individual ones of the LTE network(s)). By way of example, an AS can be an anchoring network device utilized to proxy signaling traffic for a communication session. The AS can operate as a session internet session initiation protocol (SIP) proxy or a back-to-back user agent (B2BUA). The AS (or other anchoring network device, and likewise throughout) can provide session-control services to the UE 108. In some examples, individual ones of the ASs can be connected to one or more of the subscriber data management nodes (e.g., UDM 102 and/or the HSS 104), and/or the synchronization server 110, via corresponding portions of the telecommunication network.

The ASs can include one or more telephony application servers (TASs) to provide telephony applications and additional multimedia functions. By way of example, a TAS can include a public switched telephone network (PSTN) emulation subsystem (PES) to provide emulation of calling features of a PSTN. The PES can include calling features such as call forwarding, voicemail, and/or conference bridges. The TAS can provide additional multimedia features and flexibility not available on the PSTN, the additional features including unified messaging, video calling, and/or integration of softphone clients on the UEs. In some examples, individual ones of the ASs (e.g., one or more of the TASs) can be included in the corresponding application network. In other examples, individual ones of the ASs (e.g., one or more of the TASs) can be positioned outside the corresponding application network.

In accordance with various embodiments described herein, the UE 108 may be implemented as any suitable type of computing device configured to communicate over a wireless network, including, without limitation, a mobile phone (e.g., a smart phone/handset), a tablet computer, a laptop computer, a portable digital assistant (PDA), a wearable computer (e.g., electronic/smart glasses, a smart watch, fitness trackers, head-mounted display (HMD), etc.), an in-vehicle (e.g., in-car) computer, and/or any similar mobile device, as well as situated computing devices including, without limitation, a television (smart television), set-top-box (STB), desktop computer, and the like. In accordance with various embodiments described herein, the terms "UE," "wireless communication device," "wireless device," "communication device," "mobile device," "client device," "electronic device," and "device" may be used interchangeably herein to describe any UE (e.g., the UE 108) that is capable of transmitting/receiving data wirelessly using any suitable wireless communications/data technology, protocol, or standard, such as Global System for Mobile Communications (GSM), Time Division Multiple Access (TDMA), Universal Mobile Telecommunications System (UMTS), Evolution-Data Optimized (EVDO), Long Term Evolution (LTE), Advanced LTE (LTE+), Generic Access Network (GAN), Unlicensed Mobile Access (UMA), Code Division Multiple Access (CDMA), Orthogonal Frequency Division Multiple Access (OFDM), General Packet Radio Service (GPRS), Enhanced Data GSM Environment (EDGE), Advanced Mobile Phone System (AMPS), High Speed Packet Access (HSPA), evolved HSPA (HSPA+), Voice over IP (VoIP), Voice over LTE (VoLTE), Voice over New Radio (VoNR), IEEE 802.1x protocols, WiMAX, Wi-Fi, Data Over Cable Service Interface Specification (DOCSIS), digital subscriber line (DSL), and/or any future IP-based network technology or evolution of an existing IP-based network technology, including 5G New Radio (NR) network protocols, and/or existing or legacy network technology, such as 2G, 3G, 4G, including circuit-switched networking protocols and/or packet-switched networking protocols.

Although the IMS network of the 5G network can include the UDM 102, and the IMS network of the LTE network can include the HSS 104, as discussed above in the current disclosure, it is not limited as such. In some examples, the telecommunication network in the environment 100 can include one or more IMS networks, such as an IMS network that is associated with the 5G network that includes the UDM 102, as well as with the LTE network that includes the HSS 104. In other examples, the telecommunication network in the environment 100 can include an IMS network (e.g., a first IMS network) that is associated with the 5G network and that includes the UDM 102, as well as an IMS network (e.g., a second IMS network) that is associated with the LTE network and that includes the HSS 104.

Although individual ones of the subscriber data management nodes can be included in corresponding application networks, as discussed above in the current disclosure, it is not limited as such. In some examples, individual ones of the nodes (e.g., the UDM 102) can be outside the corresponding application network (e.g., the LTE network) and in the corresponding core network (e.g., the 5G core network). In those examples or other examples, individual ones of the nodes can be between the corresponding core network and the corresponding application network, or at any other network position.

In some examples, the synchronization server 110 can be implemented as one or more ASs (e.g., a TASs), or a portion of an AS (e.g., a TAS). Although the synchronization server 110 can be implemented as a portion (e.g., a partial portion or an entire portion) of, individually or in combination, one or more ASs (e.g., TASs) as discussed above in this disclosure, it is not limited as such. The synchronization server 110 can be implemented as one or more of any of the subscriber data management nodes, one or more of any other nodes, one or more of any other servers, and/or any combination thereof.

Figure 2:
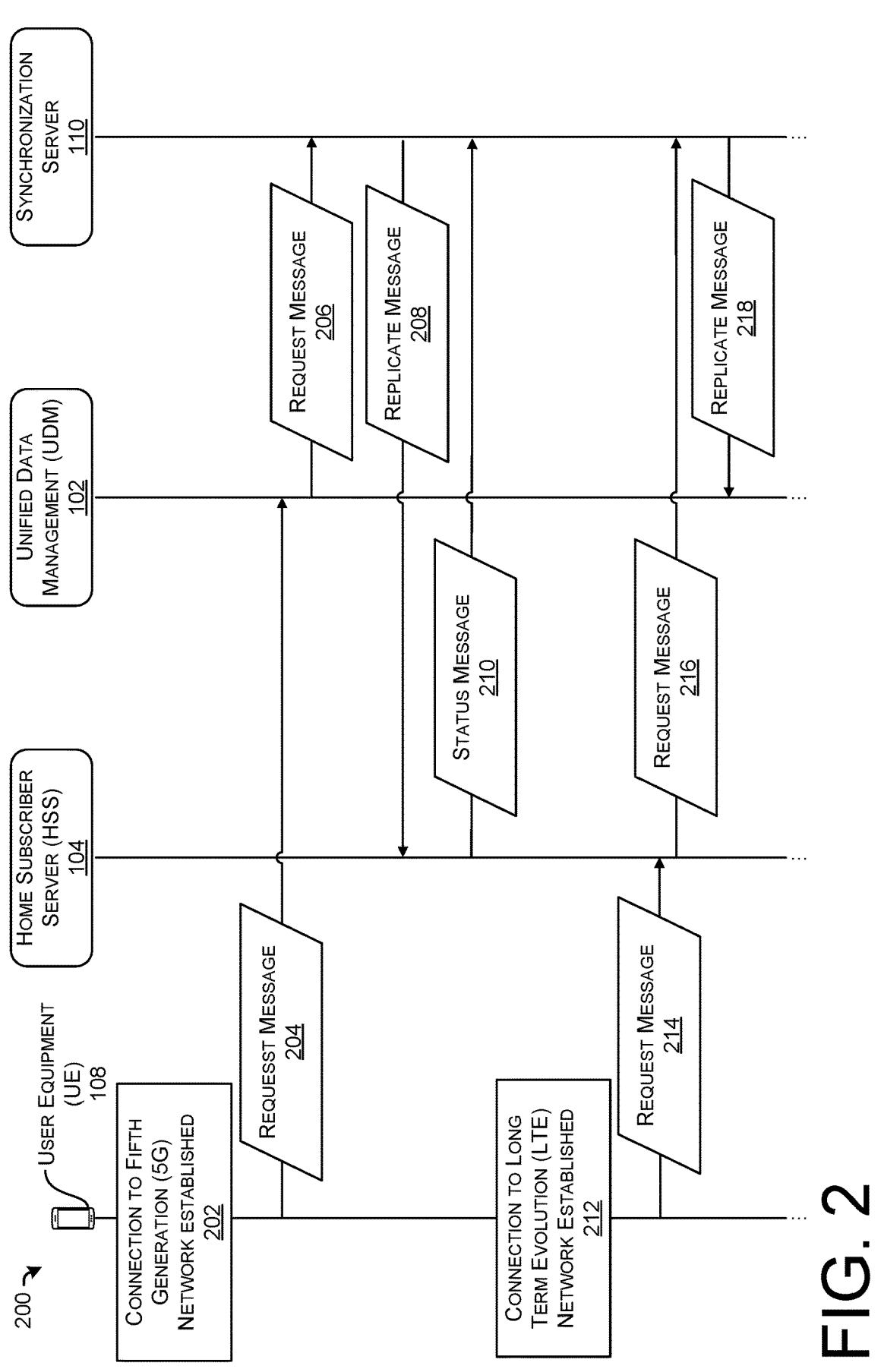
FIG. 2 is a diagram illustrating example signaling between a user equipment (UE) and nodes of application networks, including an internet protocol (IP) multimedia subsystem (IMS) network of a fifth generation (5G) network, for synchronizing supplementary service settings, as described herein.

FIG. 2 is a diagram illustrating example signaling 200 between a user equipment (UE) and nodes of application networks, including an internet protocol (IP) multimedia subsystem (IMS) network of a fifth generation (5G) network, for synchronizing supplementary service settings, as described herein.

In general, a user (or "subscriber") can utilize a UE (e.g., the UE 108, as discussed above with reference to FIG. 1), to communicate with other computing devices (e.g. nodes, servers, etc.) of a telecommunications network (e.g., a network including a fifth generation (5G) network and a long term evolution network (LTE) network). FIG. 2 depicts subscriber data management nodes (or "network elements") (e.g., the unified data management (UDM) 102, and the home subscriber server (HSS) 104, as discussed above with reference to FIG. 1), and a synchronization server (e.g., the synchronization server 110, as discussed above with reference to FIG. 1). It is to be appreciated that a telecommunications network can include additional nodes that are not shown in FIG. 2, such as nodes including, application servers (ASs) (e.g., telephony application servers (TASs)), and so on. Any of the nodes and/or servers described herein may be capable of transmitting/receiving data using any suitable communications/data technology, protocol, or standard, including those mentioned herein with respect to a UE for use in transmitting/receiving data.

One or more connections to one or more networks of various types can be established for the UE 108. At operation 202, a connection (or "current connection") (e.g., first current connection) to a 5G network can be established for the UE 108. The connection to the 5G network can be established, based on a subscription of a subscriber of the UE 108 being established with a telecommunication service provider. In some examples, the connection can be an initial connection for the UE 108. In other examples, the connection can be a connection (or "subsequent connection") subsequent to the one or more previous connections (e.g., an initial connection, and possibly one or more other connections, that were previously established) of the UE 108 to the 5G network. In some examples, individual ones of the previous connection(s) to the 5G network can be preceded by, and/or following by, the UE 108 being connected to a different type of network (e.g., an LTE network, a 2G/3G network, etc.).

Request messages can be transmitted by UEs and to subscriber data management nodes, to request storage and/or modification of subscriber data in the nodes. In some examples, a request message (e.g., a storage message, or a modify message) 204 can be transmitted by the UE 108 and received by the UDM 102. The request message 204 can be transmitted to store and/or modify subscriber data in the UDM 102 (e.g., the request message 204 can be utilized to target the UDM 102 for storage and/or modification). The request message 204 can be processed by the UDM 102, based on the connection to the 5G network. The request message 204 can be utilized to store subscriber data (e.g., one or more supplementary service settings) in the UDM 102.

In some examples, the subscriber data can be initial subscriber data, based on the UE 108 having not been previously connected to the 5G network. In those examples, the UE 108 can be associated with a subscriber for which no subscriber data was previously stored in the UDM 102. In other examples, the subscriber data can be modified subscriber data, based on subscriber data (or "previously stored subscriber data" or "previous subscriber data")) having been stored in the UDM 102 prior to transmission of the request message 204.

In some examples, the request message 204 can include a portion (e.g., a partial portion or an entire portion) of the initial subscriber data and/or the modified subscriber data (e.g., one or more supplementary services settings), which can be stored as a replacement of a portion (e.g., a partial portion or an entire portion) of the previously stored subscriber data (e.g., one or more previously stored supplementary service settings (or "previous supplementary service setting(s)"). In other examples, the request message 204 can include one or more identifiers associated with the portion of the initial subscriber data and/or the modified subscriber data. In those or other examples, the portion of the initial subscriber data and/or the modified subscriber data can be transmitted to the UDM 102 in one or more other messages, and/or accessed or retrieved by the UDM 102 from any device in which the portion of the initial subscriber data and/or the modified subscriber data is stored.

In some examples, the previous subscriber data stored in the UDM 102 after the establishment of the current connection, may be based on the UE 108 having not been connected to any network prior to the establishment of the current connection. In other examples, the previous subscriber data being stored in the UDM 102 prior to the establishment of the current connection may be based on the UE 108 having been, prior to the establishment of the current connection, previously connected to the 5G network and possibly to one or more other networks of various types (e.g., the LTE network).

Subscriber data management nodes can transmit request messages to a synchronization server 110 to request replication of stored subscriber data. In some examples, the UDM 102 can transmit a request message 206 to the synchronization server 110, based on the request message 204 and/or the subscriber data (e.g., the initial subscriber data or the modified subscriber data) being stored in the UDM 102. The request message 206 can be utilized by the UDM 102 to request replication, in one or more other nodes (e.g., the HSS 104), of the stored subscriber data. In some examples, the request message 206 can include the stored subscriber data. In other examples, the request message can include and/or one or more identifiers associated with the stored subscriber data (e.g., the request message 206 can include individual identifier(s) associated with corresponding supplemental service setting(s), and/or an identifier associated with, as a group, the supplemental service setting (s)) (e.g., the identifier(s) in the request message 206 can be the same as, or different from, the identifier(s) in the request message 204). In those or other examples, the portion of the initial subscriber data and/or the modified subscriber data can be transmitted to the synchronization server 110 in one or more other messages, and/or accessed or retrieved by the UDM 102 from any device in which the portion of the initial subscriber data and/or the modified subscriber data is stored.

The synchronization server 110 can receive request messages and transmit replicate messages to other subscriber data management nodes (e.g., the HSS 104, and/or possibly a home location register (HLR) (e.g., the HLR 106, as discussed above with reference to FIG. 1), etc.). In some examples, the synchronization server 110 can receive the request message 206 and transmit a replicate message 208 to the HSS 104. The replicate message 208 can be utilized to request replication, in the HSS 104, of the subscriber data (e.g., the initial subscriber data and/or the modified subscriber data) stored in the UDM 102.

Although the replicate message 208 can be transmitted based on the request message 206 as discussed above in the current disclosure, it is not limited as such. In some examples, individual ones of one or more replicate message can be transmitted to corresponding node(s) in correspond networks of various types, to request replication of the stored subscriber data in the corresponding node(s).

Nodes that receive replicate messages can be utilized to perform replication processes of the stored initial and/or modified subscriber data, and, possibly, to transmit messages indicating statuses of the replication processes. In some examples, the HSS 104 can transmit a status message 210 indicating a status of replication of the subscriber data stored in the UDM 102. In some examples, the status message 210 can be transmitted as a confirm message indicating successful replication, based on replication of the subscriber data stored in the UDM 102 being successfully completed. In other examples, the status message 210 can be transmitted as an error message indicating unsuccessful replication, based on replication (e.g., attempted replication) of the subscriber data stored in the UDM 102 not being successfully completed (e.g., partially, or entirely, unsuccessful).

The status message 210 being transmitted as a confirm message can include one or more flags (e.g., confirmation flags) associated with replication the stored subscriber data. By way of example, the confirm message can include a confirmation flag indicating successful completion of the replication. The status message 210 being transmitted as an error message can indicate one or more errors in replicating the stored subscriber data. By way of example, the error message can include a flag indicating occurrence of the error(s), and/or one or more identifiers (or "indicator(s)" or "flag(s)"), with individual ones of the identifiers indicating corresponding error type(s).

In some examples, the supplementary service setting can be restored in the UDM 102, based on replication in the HSS 104 being unsuccessful. The supplementary service setting can be restored based on a message transmitted by the synchronization server 110 and to the UDM 102, the message being transmitted based on the status message received from the UDM 102.

Connections between UEs and the LTE network can be established. At operation 212, a connection (or "current connection") (e.g., second current connection) to the LTE network can be established for the UE 108. The connection to the LTE network can be established in a similar way as for the connection to the 5G network, and in any order with respect to the connection to the 5G network (e.g., prior to, or after, the connection to the 5G network). For example, the connection to the LTE network can be an initial connection, or a connection that is established subsequent to a previously established initial connection to the LTE network and/or any other network.

Storage and replication of subscriber data based on messages transmitted by UEs connected to the LTE network can be processed in a similar way as for messages transmitted by UEs connected to the 5G network, as discussed above. By way of examples, the UE 108 connected to the LTE network can transmit a request message (e.g., a storage message, or a modify message) 214 to the HSS 104 in a similar way as for the request message 204 that is transmitted to the UDM 102. The request message 214 can be processed, and utilized, by the HSS 104 to transmit a request message 216 in a similar way as for the request message 206 that is transmitted by the UDM 102 (e.g., the request message 214 can be utilized to target the HSS 104 for storage and/or modification). The request message 216 can be processed, and utilized, by the synchronization server 110 to transmit a replicate message 218 in a similar way as for the replicate message 208 transmitted by the synchronization server 110. The replicate message 218 can be processed, and utilized, by the UDM 102 to transmit a status message in a similar way as for the status message 210 transmitted by the HSS 104.

In some examples, the supplementary service setting can be restored in the HSS 104, based on replication in the UDM 102 being unsuccessful. The supplementary service setting can be restored based on a message transmitted by the synchronization server 110 and to the HSS 104, the message being transmitted based on the status message transmitted by the UDM 102.

Although request messages can be transmitted to the synchronization server 110 based on successful storage and/or modification of subscriber data, as discussed above in the current disclosure, it is not limited as such. Status messages, alternatively or in addition to, the request messages, can be transmitted to the synchronization server 110. In some instances, with examples in which one or more statuses are determined by the nodes attempting to store and/or modify subscriber data, the statuses (e.g., one or more confirm statuses and/or one or more error statuses) can be indicated via the status messages and/or the request messages (e.g., the request message 206, the request message 216 etc.) transmitted to the synchronization server 110. The status messages transmitted to the synchronization server 110 based on the request messages received from the UE 108 can indicate whether storage and/or modification of the subscriber data was successful or unsuccessful.

In some examples, the status messages can be transmitted to the synchronization server 110 as confirm messages or error messages, in a similar way as for the status messages transmitted to the synchronization server 110 based on the replicate messages. By way of example, the synchronization server 110 can receive, as an error message, a status message from the UDM 102 indicating storage (e.g., attempted storage) of the subscriber data was unsuccessful, and refrain from transmitting the replicate message 208. The status message (e.g., the error message or the confirm message) can be transmitted, in addition or alternatively, to the corresponding request message (e.g., the request message 206 or the request message 216); and/or the corresponding status (e.g., the successful or unsuccessful storage of any of the supplementary service setting(s)) can be indicated in the corresponding request message (e.g., the request message 206 or the request message 216).

Although status messages of various types can be transmitted to the synchronization server 110 as discussed above in the current disclosure, it is not limited as such. In some examples, individual ones of status messages of any type (e.g., status messages indicating successful and/or unsuccessful storage of subscriber data, successful and/or unsuccessful modification of subscriber data modification, and/or successful and/or unsuccessful replication of subscriber data) can be transmitted by the subscriber data management nodes and to the UE 108, alternatively or in addition to, the corresponding status messages transmitted to the synchronization server 110. In other examples, individual ones of status messages (or "synchronization server originated status messages") of any type (e.g., status messages indicating successful and/or unsuccessful storage, modification, and/or replication of subscriber data) can be transmitted by the synchronization server 110 and to the UE 108, based on the status messages (or "node originated status messages") transmitted by the subscriber data management nodes and to the synchronization server 110. The synchronization server originated status messages can be transmitted by the synchronization server 110, alternatively or in addition to, the node originated status messages transmitted by the subscriber data management nodes.

Status messages transmitted from the subscriber data management nodes and to the UE 108 can include the information that is included in corresponding status messages transmitted from the synchronization server 110 and to the UE 108. Status information in the corresponding status messages transmitted by the synchronization server 110 can be generated by, and received from, the corresponding subscriber data management nodes. The status information generated by the subscriber data management nodes can be utilized by the subscriber data management nodes to transmit status messages of any type to the UE 108, and/or to transmit status messages of any type to the synchronization server 110, which can then be routed to the UE 108.

Although the nodes that store subscriber data can receive transmit, and/or process one or more various types of requests as discussed above in the current disclosure, it is not limited as such. Such language is utilized for simplicity and clarity; and, in any of the techniques as discussed throughout the disclosure, individual ones of the nodes can be interpreted as being implemented as one or more servers receiving, transmitting, and/or processing any of various types of requests to manage the subscriber data stored in one or more databases of, individually or in combination, the server(s) and/or one or more other computing devices.

Figure 3:
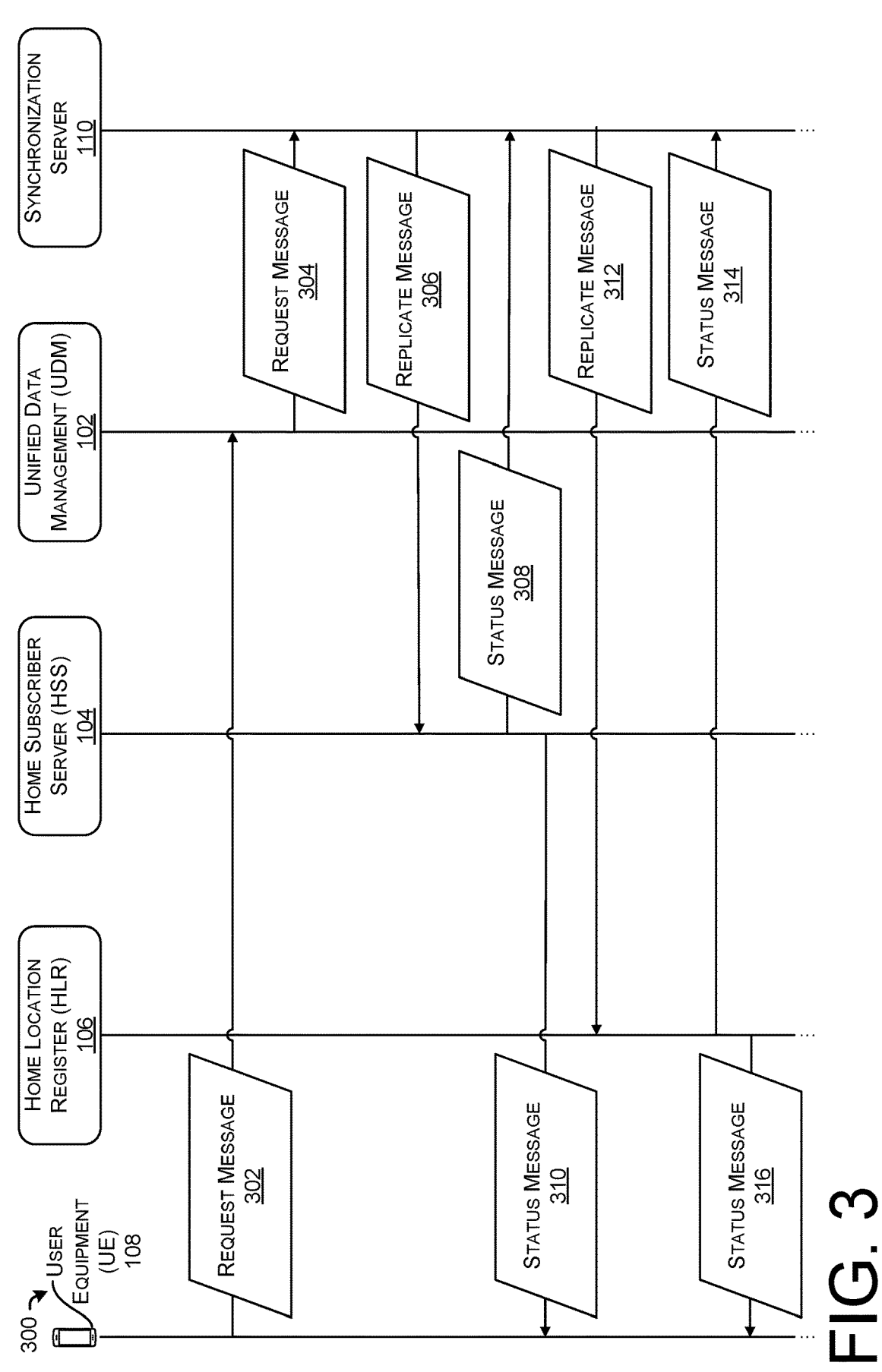
FIG. 3 is a diagram illustrating example signaling between a user equipment (UE) and nodes of application networks, including an internet protocol (IP) multimedia subsystem (IMS) network of a fifth generation (5G) network, for synchronizing supplementary service settings, as described herein.

FIG. 3 is a diagram illustrating example signaling 300 between a user equipment (UE) and nodes of application networks, including an internet protocol (IP) multimedia subsystem (IMS) network of a fifth generation (5G) network, for synchronizing supplementary service settings, as described herein.

In general, a user can utilize a UE (e.g., the UE 108, as discussed above with reference to FIG. 1), to communicate with other computing devices (e.g., the unified data management (UDM) 102 and/or the home subscriber server (HSS) 104) of a telecommunications network (e.g., a network including a fifth generation (5G) network and a long term evolution network (LTE) network. The UE 108 can be connected to the 5G network.

In some examples, the telecommunications network can include a second generation (2G)/third generation (3G) network). In those examples, a request message (e.g., a storage message, or a modify message) 302, a request message 304, a replicate message 306, and a status message 308 can be transmitted and processed in a similar way as for the request message 204, the request message 206, the replicate message 208, and the status message 210, respectively, as discussed above with reference to FIG. 2.

It is to be appreciated that a telecommunications network can include additional nodes that are not shown in FIG. 2, such as nodes including, application servers (ASs) (e.g., telephony application servers (TASs)), and so on. Any of the nodes and/or servers described herein may be capable of transmitting/receiving data using any suitable communications/data technology, protocol, or standard, including those mentioned herein with respect to a UE for use in transmitting/receiving data.

Status messages associated with replication and/or attempted replication can be transmitted to UEs in a similar way as for the status messages transmitted to the synchronization server 110, as discussed above with reference to FIG. 2. By way of example, a status message 310 can be transmitted by the HSS 104 and to the UE 108. The status message 308 and/or the status message 310 can include status information generated by the HSS 104, the status information indicating individual ones of one or more statuses of replication or attempted replication of corresponding supplementary service setting(s) based on the replicate message 306.

Replication can be performed based on replicate messages (e.g., replicate messages transmitted by the synchronization server 110 and to subscriber data management nodes) and/or status messages (e.g. status messages associated with the replication) received by the synchronization server 110. Individual ones of one or more replicate messages can be transmitted by the synchronization server 110 and to the corresponding subscriber data management nodes. In some examples, the replicate messages can include a replicate message 312. The replicate message 312 can be transmitted by the synchronization server 110 and to a home location register (HLR) (e.g., the HLR 106).

The replicate message 306, and/or the replicate message 312 can be transmitted in various ways and/or orders. The replicate message 312 can be transmitted based on the request message 304, the replicate message 306, and/or the status message 308. The replicate message 312 can be transmitted in any order with respect to the request message 304, the replicate message 306, and/or the status message 308. In some examples, by utilizing the status message 308 to transmit the replicate message 312, the synchronization server 110 can manage transmission of replicate messages to the HLR 106, based on information provided by the HSS 104, independently of information provided by the UDM 102.

In some examples, status information associated with replication can be processed by the synchronization server 110 as the status information associated with modification. In some examples, the synchronization server 110 can transmit, based on the status information associated with replication, which is processed as the status information associated with modification, replicate messages to one or more remaining ones of the subscriber data management nodes. By way of example, the synchronization server 110 can transmit, based on the status information in a status message associated with modification based on the request message 302, and/or the status message 308 associated with replication based on the replicate message 306, a replicate message 312 to the HLR 106.

The synchronization server 110 can determine, in various ways, which subscriber data management nodes are to receive replicate messages. In some examples, the synchronization server 110 can determine the HSS 104 is to receive the replicate message 306 and the HLR 106 is to receive the replicate message 312 based on instructions stored in the synchronization server, and/or based on one or more identifiers received in the request message 304 (e.g., one or more identifiers (or "node identifiers") associated with the HSS 104 and the HLR 106, respectively). In those or other examples, the synchronization server 110 can determine the HLR 106 is to receive the replicate message 312 based on an identifier received from the HSS 104 (e.g., a node identifier associated with the HLR 106 that is received in the status message 308).

In some examples, the synchronization server 110 can determine, based on instructions and/or information stored in the synchronization server 110 that indicates previously transmitted and/or received messages (e.g., the request message 304, the replicate message 306, and/or the status message 308), the HSS 104 is to receive the replicate message 306 and/or the HLR 106 is to receive the replicate message 312. In those examples, the node identifier(s) may, or may not, be included in the request message 304, the replicate message 306, and/or the status message 308.

Status messages can be generated, and transmitted by, the HLR 106 in a similar way as for the UDM 102 and/or the HSS 104. By way of example, the HLR 106 can generate, and transmit, a status message 314 and a status message 316, in a similar way as for the HSS 104 generating and transmitting the status message 308 and the status message 310, respectively.

In some examples, the supplementary service setting can be restored in the UDM 102 and/or the HSS 104, based on replication in the HLR 106 being unsuccessful. The supplementary service setting can be restored based on corresponding message(s) transmitted by the synchronization server 110 and to the UDM 102 and/or the HSS 104, the message(s) being transmitted based on the status message 314.

Although status messages associate with replication and/or attempted replication can be transmitted as discussed above in this disclosure, it is not limited as such. Status messages associated with storage or attempted storage of initial subscriber data, and/or associated with modification or attempted modification of subscriber data, can be transmitted by the corresponding subscriber data management nodes in a similar way as for transmission, by the UDM 102, of the status messages associated with modification and/or attempted modification, as discussed above with respect to FIG. 2. In some examples, status messages (e.g., status messages associated with storage or attempted storage of initial subscriber data, and/or associated with modification and/or attempted modification of subscriber data) received by the synchronization server 110, as discussed throughout this disclosure, can include similar node identifier(s) indicating nodes for replication, as in the status messages 308, as discussed above. In some examples, the status messages (e.g., status messages associated with storage or attempted storage of initial subscriber data, and/or associated with modification and/or attempted modification of subscriber data) received by the synchronization server 110 can be utilized to refrain from transmitting one or more replicate messages (e.g., a status message received as an error message from the UDM 102 and by the synchronization server 110, based on the request message 302, can be utilized by the synchronization server 110 to refrain from transmitting the replicate message 306 and/or the replicate message 312).

Although messages, such as request messages (e.g., the request message 302) and/or status messages (e.g., a status message transmitted by the synchronization server and to the UE 108 based on individual ones of the status message 308 and the status message 314), can be transmitted to, and/or received by, the UE 108, as discussed in the current disclosure, it is not limited as such. In some examples, any message exchanged between the UE 108 and individual ones of the subscriber data management nodes (e.g., the UDM 102 and the HSS 104) of the 5G network or the LTE network, and/or any message exchanged between the UE 108 and the synchronization server 110, can be exchanged via an AS (e.g., a TAS).

Although messages, such as request messages (e.g., the request message 304) and replicate messages (e.g., the replicate message 306), can be transmitted from, and/or received by, the corresponding subscriber data management node (e.g., the UDM 102 or the HSS 104) of the 5G network or the LTE network, as discussed in the current disclosure, it is not limited as such. In some examples, any message exchanged between the synchronization server 110 and the corresponding subscriber data management node (e.g., the UDM 102 or the HSS 104) of the 5G network or the LTE network, and/or any message exchanged between the synchronization server 110 and the UE 108, can be exchanged via the AS (e.g., the TAS). The AS (e.g., the TAS) utilized to exchange messages between the synchronization server 110 and individual ones of the corresponding subscriber data management nodes (e.g., the UDM 102 or the HSS 104) of the 5G network or the LTE network can be the same as, or different from, the AS (e.g., the TAS) utilized to exchange messages between the UE 108 and the corresponding subscriber data management nodes (e.g., the UDM 102 or the HSS 104) of the 5G network or the LTE network.

Although replication, in the HSS 104 and/or the HLR 106, of storage and/or modification of the subscriber data in the UDM 102 can be performed, as discussed above in the current disclosure, it is not limited as such. In some examples, replication, in any of one or more of the UDM 102, the HSS 104, and the HLR 106, of storage and/or modification of subscriber data in any remaining ones of the HSS 104 and the HLR 106, can be performed in a similar way as for the replication, in the HSS 104 and the HLR 106, of storage and/or modification of the subscriber data in UDM 102. In other words, the UDM 102 can be synchronized with one or more of the HSS 104 and the HLR 106, and vice versa.

Although the synchronization server 110 is utilized to the replicate subscriber data stored in the subscriber data management nodes, as discussed above in the current disclosure, it is not limited as such. In some examples, one or more nodes of the telecommunication network (e.g., the UDM 102, the HSS 104, and/or the HLR 106) can be combined, and/or integrated, with a portion (e.g., a partial portion or an entire portion) of one or more components and/or one or more functions of the synchronization server 110.

Although the synchronization server 110 can be utilized to replicate, in the HSS 104 and/or the HLR 106, subscriber data that is stored and/or modified in the UDM 102, as discussed above in the current disclosure, it is not limited as such. In some examples, the synchronization server 110 can be utilized to replicate, in the UDM 102 and/or HLR 106, subscriber data that is stored and/or modified in the HSS 104. In those or other examples, the synchronization server 110 can be utilized to replicate, in the UDM 102 and/or HSS 104, subscriber data that is stored and/or modified in the HLR 106. In some instances, with examples in which the synchronization server 110 is utilized to replicate, in the HSS 104 and/or the HLR 106, subscriber data that is stored and/or modified in the UDM 102, the UDM 102 and the HSS 104 can be synchronized; and the HSS 104 and the HLR 106 can be synchronized (e.g., the UDM 102 can be synchronized with the HSS 104, but not the HLR 106, based on the HSS 104 and the HLR 106 being synchronized; or the UDM 102 can be synchronized with the HSS 104 and the HLR 106).

Although messages transmitted by the UE 108 can be utilized by the UDM 102, the HSS 104, the HLR 106, and/or the synchronization server 110 to synchronize the UDM 102, the HSS 104, and/or the HLR 106, as discussed above in the current disclosure, it is not limited as such. In some examples, synchronization can be performed by the synchronization server 110 based on one or more messages transmitted by other types of devices (e.g., a customer care device), in a similar way as for the synchronization based on the messages transmitted by the UE 108.

Figure 4:
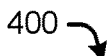
FIG. 4 illustrates a flowchart of a supplementary service settings synchronization process for nodes of application networks, including an internet protocol (IP) multimedia subsystem (IMS) network of a fifth generation (5G) network, in accordance with some examples of the present disclosure.

FIG. 4 illustrates a flowchart of a supplementary service settings synchronization process 400 for nodes of application networks, including an internet protocol (IP) multimedia subsystem (IMS) network of a fifth generation (5G) network, in accordance with some examples of the present disclosure.

At least part of the process 400 may be performed by the UDM 102, the HSS 104, the HLR 106, the UE 108, the synchronization server 110, and/or by any other suitable computing device(s), as described herein.

At operation 402, the process can include receiving a request message 206 indicating modification of a supplementary service setting stored in a database (e.g., a database of the UDM 102, a database of the HSS 104, or a database of the HLR 106). The request message 206 can be received by the synchronization server 110. The request message 206 can be received via a telecommunications network (e.g., a network including a 5G network, an LTE network, and/or a 2G/3G network) and in response to a request message 204 transmitted by the UE 108. The request message 206 can indicate modification of the supplementary service setting in the UDM 102, the HSS 104, or the HLR 106, to a modified supplementary service setting. In some examples, the database can be a first database (e.g., the database of the HSS 104 or a second database (e.g., the database of the HSS 104 or the database of the HLR 106).

At operation 404, the process can include transmitting a replicate 208 message to request replication of the modified supplementary service setting in a remaining database. The replicate 208 message can be transmitted by the synchronization server 110. The remaining database can be one of the first database (e.g., the database of the UDM 102) and the second database (e.g., the database of the HSS 104 or the database of the HLR 106) in which the supplementary service setting was not modified. In some instances, with examples in which the database is the first database (e.g., the database of the UDM 102), the remaining database can be the second database (e.g., the database of the HSS 104 or the database of the HLR 106. In other instances, with examples in which the database is the second database (e.g., the database of the HSS 104 or the database of the HLR 106, the remaining database can be the first database (e.g., the database of the UDM 102).

At operation 406, the process can include receiving a confirm message indicating successful replication of the supplementary service setting. In some examples, a status message 210 can be received, as the confirm message, by the synchronization server 110. The confirm message can be received based on successful replication, in the remaining database, of the modified supplementary setting.

Figure 5:
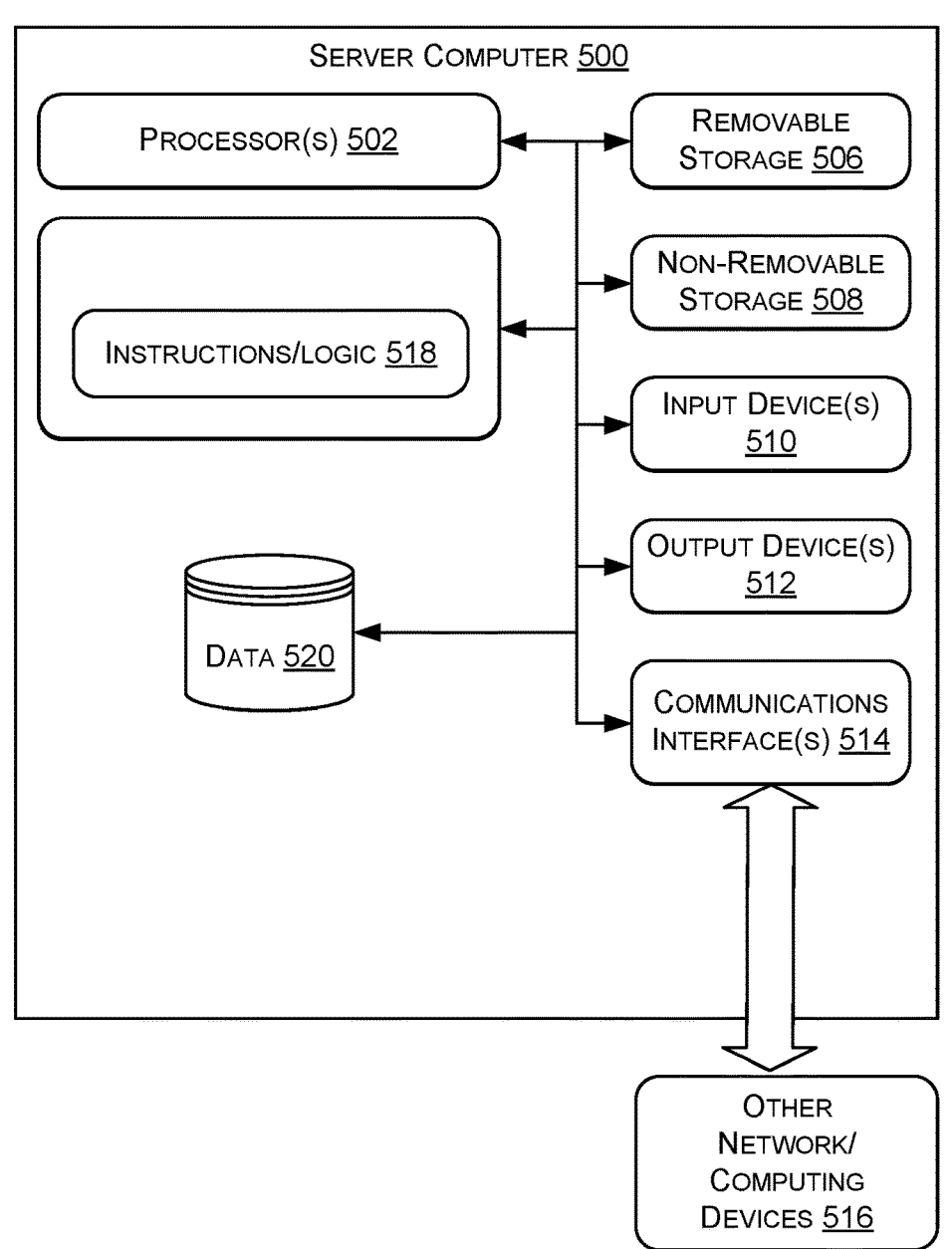
FIG. 5 is a block diagram of an example server computer utilized to implement one or more nodes of application networks, including an internet protocol (IP) multimedia subsystem (IMS) network of a fifth generation (5G) network, for synchronizing supplementary service settings, in accordance with some examples of the present disclosure.

FIG. 5 is a block diagram of an example server computer 500 utilized to implement one or more nodes of application networks, including an internet protocol (IP) multimedia subsystem (IMS) network of a fifth generation (5G) network, for synchronizing supplementary service settings, in accordance with some examples of the present disclosure.

The server computer 500 may be representative of an individual node (or network element) (e.g., any of the UDM 102, the HSS 104, and the HLR 106, as discussed above with reference to FIG. 1) or multiple nodes (or network elements) (e.g., a combination of the UDM 102, the HSS 104, and/or the HLR 106) of a telecommunications network. The server computer 500 may be representative of a server (e.g., the synchronization server 110, as discussed above with reference to FIG. 1), individually or in combination, with any of the subscriber data management nodes ((e.g., one or more of the UDM 102, the HSS 104, and the HLR 106), and/or, individually or in combination, one or more of any other node and/or server (e.g., a telephony application servers (TAS)) of the telecommunications network.

As shown, the server computer 500 may include one or more processors 502 and one or more forms of computer-readable memory 504. The server computer 500 may also include additional storage devices. Such additional storage may include removable storage 506 and/or non-removable storage 508.

The server computer 500 may further include input devices 510 (e.g., a touch screen, keypad, keyboard, mouse, pointer, microphone, etc.) and output devices 512 (e.g., a display, printer, speaker, etc.) communicatively coupled to the processor(s) 502 and the computer-readable memory 504. The server computer 500 may further include communications interface(s) 514 that allow the server computer 500 to communicate with other computing devices 516 (e.g., other nodes, a UE(s), etc.) such as via a network. The communications interface(s) 514 may facilitate transmitting and receiving wired and/or wireless signals over any suitable communications/data technology, standard, or protocol, as described herein.

In various embodiments, the computer-readable memory 504 comprises non-transitory computer-readable memory 504 that generally includes both volatile memory and non-volatile memory (e.g., random access memory (RAM), read-only memory (ROM), erasable programmable read-only memory (EEPROM), Flash Memory, miniature hard drive, memory card, optical storage, magnetic cassettes, magnetic tape, magnetic disk storage or other magnetic storage devices, or any other medium). The computer-readable memory 504 may also be described as computer storage media and may include volatile and nonvolatile, removable and non-removable media implemented in any method or technology for storage of information, such as computer readable instructions, data structures, program modules, or other data. Computer-readable memory 504, removable storage 506 and non-removable storage 508 are all examples of non-transitory computer-readable storage media. Computer-readable storage media include, but are not limited to, RAM, ROM, EEPROM, flash memory or other memory technology, compact disc read-only memory (CD-ROM), digital versatile disks (DVD) or other optical storage, magnetic cassettes, magnetic tape, magnetic disk storage or other magnetic storage devices, or any other medium which can be used to store the desired information and which can be accessed by the server computer 500. Any such computer-readable storage media may be part of the server computer 500.

The memory 504 can include logic 518 (i.e., computer-executable instructions that, when executed, by the processor(s) 502, perform the various acts and/or processes disclosed herein) to implement synchronization of subscriber data, according to various examples as discussed herein. For example, the logic 518 is configured to carry out the signaling 200 and/or 300, and/or the process 400, as discussed herein. The memory 504 can further be used to store data 520, which may be used to implement synchronization of subscriber data, as discussed herein. In one example, the data 520 may include subscriber data (e.g., supplementary service setting(s), as discussed above with reference to FIG. 1).

The environment and individual elements described herein may of course include many other logical, programmatic, and physical components, of which those shown in the accompanying figures are merely examples that are related to the discussion herein.

The various techniques described herein are assumed in the given examples to be implemented in the general context of computer-executable instructions or software, such as program modules, that are stored in computer-readable storage and executed by the processor(s) of one or more computers or other devices such as those illustrated in the figures. Generally, program modules include routines, programs, objects, components, data structures, etc., and define operating logic for performing particular tasks or implement particular abstract data types.

Other architectures can be used to implement the described functionality, and are intended to be within the scope of this disclosure. Furthermore, although specific distributions of responsibilities are defined above for purposes of discussion, the various functions and responsibilities might be distributed and divided in different ways, depending on circumstances.

Similarly, software can be stored and distributed in various ways and using different means, and the particular software storage and execution configurations described above can be varied in many different ways. Thus, software implementing the techniques described above can be distributed on various types of computer-readable media, not limited to the forms of memory that are specifically described.

What is claimed is:

1. A system, comprising:

one or more processors; and memory storing computer-executable instructions that, when executed by the one or more processors, cause the one or more processors to perform operations comprising:

receiving, via a telecommunications network and in response to a modify message transmitted by a user equipment (UE), a request message indicating modification of a supplementary service setting stored in a database to a modified supplementary service setting, wherein the database is a first database or a second database, the first database being a home subscriber server (HSS) database, the second database being a unified data management (UDM) database or a home location register (HLR) database;

transmitting, based on the request message, a replicate message to request replication of the modified supplementary service setting in a remaining database, the remaining database being one of the first database and the second database in which the supplementary service setting was not modified; and receiving a confirm message in response to the replicate message, the confirm message indicating successful replication of the supplementary service setting.

2. The system of claim 1, the operations further comprising:

receiving, in the request message, a confirmation flag indicating the modified supplementary service setting is stored in the first database based on an identifier received in the request message, the identifier indicating the HSS database.

3. The system of claim 1, wherein the second database is the UDM database, and the modified supplementary service setting is stored in the UDM database and replicated in the HSS database, the operations further comprising:

receiving, in a second confirm message, a second confirmation flag indicating the modified supplementary service setting is successfully replicated in the HSS database.

4. The system of claim 1, wherein the second database is the UDM database, and the modified supplementary service setting is stored in the HSS database and replicated in the UDM database, the operations further comprising:

receiving, in a second confirm message, a second confirmation flag indicating the modified supplementary service setting is successfully replicated in the UDM database.

5. The system of claim 1, the operations further comprising:

determining a second supplementary service setting is modified to a second modified supplementary service setting;

attempting to replicate the second modified supplementary service setting; and receiving an error message in response to an error in replicating the second modified supplementary service setting.

6. The system of claim 1, the operations further comprising:

attempting to modify a second supplementary service setting to a second modified supplementary service setting;

receiving an error message in response to an error in modifying the second supplementary service setting; and refraining from transmitting a second replicate message to request replication of the second modified supplementary service setting.

7. The system of claim 1, wherein the second database is the UDM database, the modified supplementary service setting is stored in the UDM database, replication of the modified supplementary service setting in the HSS database is unsuccessful, and the supplementary service setting is restored in the UDM database.

8. The system of claim 1, wherein the second database is the UDM database, the modified supplementary service setting is stored in the HSS database, replication of the modified supplementary service setting in the UDM database is unsuccessful, and the supplementary service setting is restored in the HSS database.

9. The system of claim 1, wherein the second database is the UDM database, and the modified supplementary service setting is stored in the HSS database, the operations further comprising:

transmitting, to the UE, a second confirm message indicating successful replication of the modified supplementary service setting of the HSS database in the UDM database.

10. The system of claim 1, wherein the second database is the UDM database, and the modified supplementary service setting is stored in the UDM database, the operations further comprising:

transmitting, to the UE, a second confirm message indicating successful replication of the modified supplementary service setting of the UDM database in the HSS database.

11. A method, comprising:

receiving, via a telecommunications network and in response to a modify message transmitted by a user equipment (UE), a request message indicating modification of a supplementary service setting stored in a database to a modified supplementary service setting, the database being a first database or a second database, the first database being a home subscriber server (HSS) database;

transmitting a replicate message to request replication of the modified supplementary service setting in a remaining database, the remaining database being one of the first database and the second database in which the supplementary service setting was not modified; and receiving, in response to the replicate message, a confirm message indicating successful replication of the supplementary service setting.

12. The method of claim 11, wherein the second database is a unified data management (UDM) database or a home location register (HLR) database.

13. The method of claim 11, further comprising:

determining a type of the request message; and receiving, in the request message, a confirmation flag indicating the modified supplementary service setting is stored in the first database based on the type of the request message being utilized to target the HSS database for the modification.

14. The method of claim 11, wherein the second database is a unified data management (UDM) database, and the modified supplementary service setting is stored in the UDM database and replicated in the HSS database, further comprising:

receiving, in a second confirm message, a second confirmation flag indicating the modified supplementary service setting is successfully replicated in the HSS database.

15. The method of claim 11, further comprising:

determining a second supplementary service setting is modified to a second modified supplementary service setting;

attempting to replicate the second modified supplementary service setting; and receiving an error message in response to an error in replicating the second modified supplementary service setting.

16. The method of claim 11, wherein the second database is a unified data management (UDM) database, the modified supplementary service setting is stored in the UDM database, replication of the modified supplementary service setting in the HSS database is unsuccessful, and the supplementary service setting is restored in the UDM database.

17. A system comprising:

one or more processors;

a memory; and one or more components stored in the memory and executable by the one or more processors to perform operations comprising:

receiving, via a telecommunications network and in response to a modify message transmitted by a user equipment (UE), a request message indicating modification of a supplementary service setting stored in a database to a modified supplementary service setting, the database being a first database or a second database, the first database being a home subscriber server (HSS) database;

transmitting a replicate message to request replication of the modified supplementary service setting in a remaining database, the remaining database being one of the first database and the second database in which the supplementary service setting was not modified; and receiving, in response to the replicate message, a confirm message indicating successful replication of the supplementary service setting.

18. The system of claim 17, wherein the second database is a unified data management (UDM) database or a home location register (HLR) database.

19. The system of claim 17, the operations further comprising:

determining a type of the request message; and receiving, in the request message, a confirmation flag indicating the modified supplementary service setting is stored in the first database based on the type of the request message being utilized to target the HSS database for the modification.

20. The system of claim 17, the operations further comprising:

determining a second supplementary service setting is modified to a second modified supplementary service setting;

attempting to replicate the second modified supplementary service setting; and receiving an error message in response to an error in replicating the second modified supplementary service setting.

* * * * *